Feb. 19, 1952             R. L. DIVOLL             2,586,010
VELOCITY AND DIRECTION INDICATOR
Filed Sept. 20, 1946                                         2 SHEETS—SHEET 1
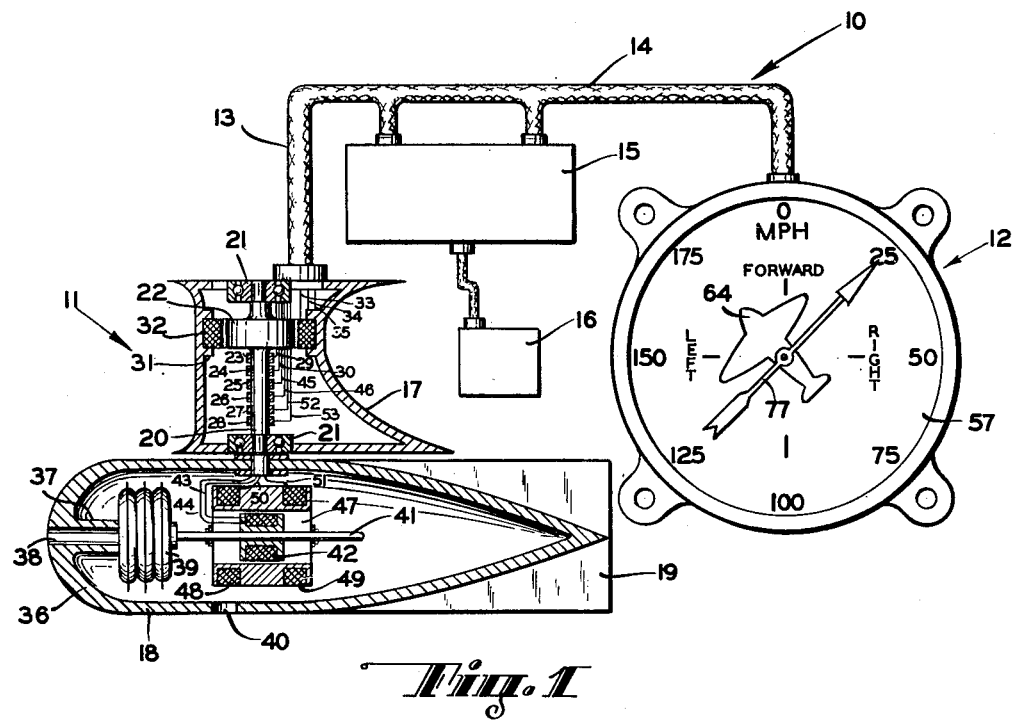
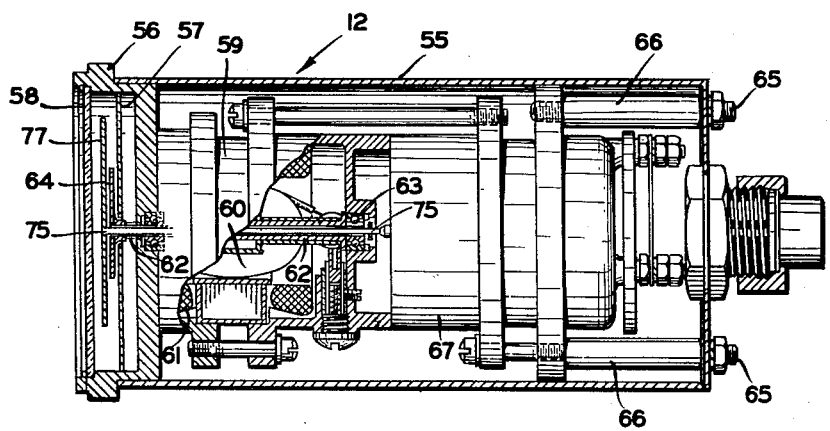
INVENTOR
RICHARD L. DIVOLL
BY
ATTORNEY

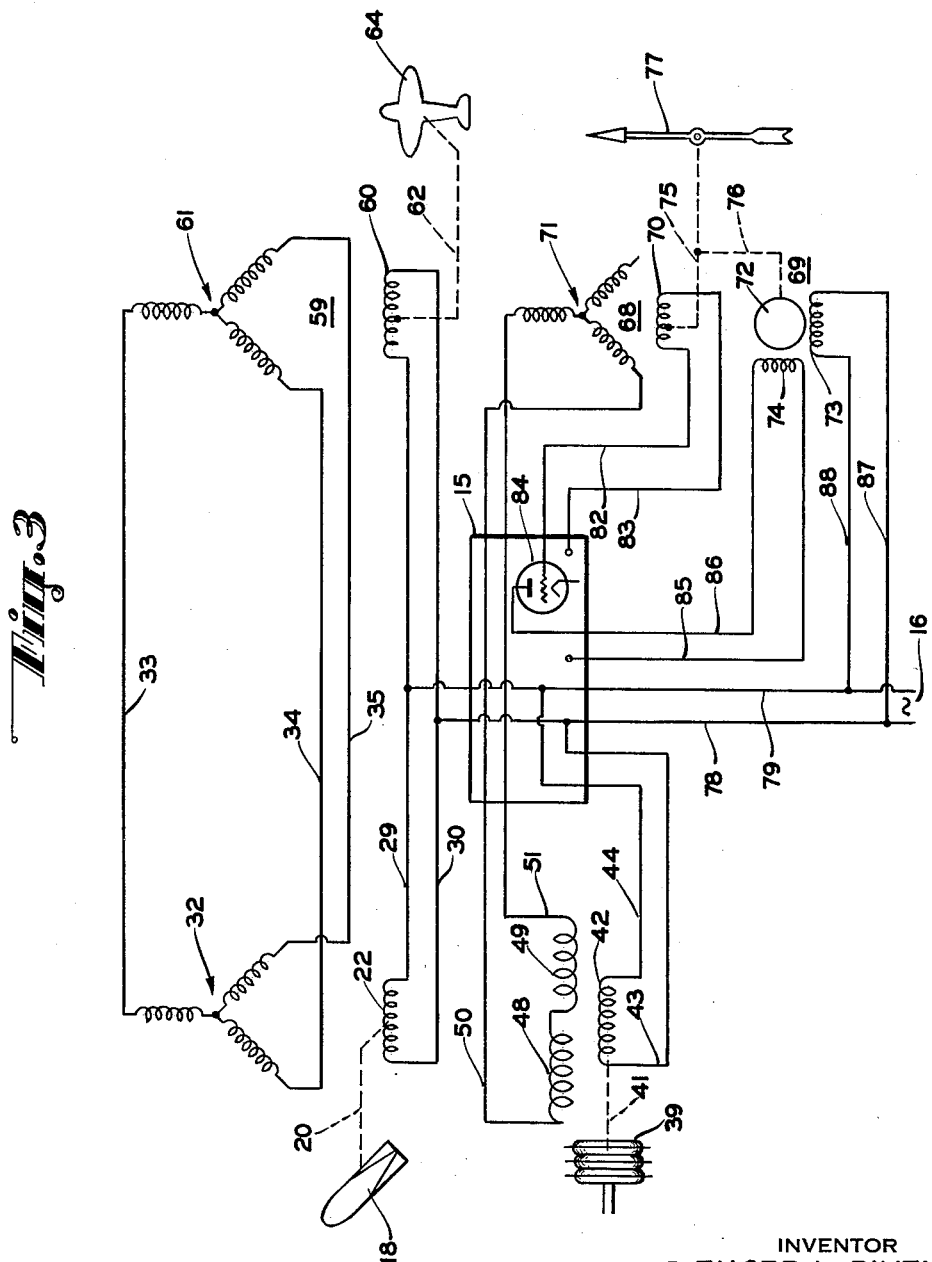

Patented Feb. 19, 1952

2,586,010

UNITED STATES PATENT OFFICE 2,586,010

VELOCITY AND DIRECTION INDICATOR

Richard L. Divoll, Haworth, N. J., assignor to Bendix Aviation Corporation, Teterboro, N. J., a corporation of Delaware Application September 20, 1946, Serial No. 698,127

4 Claims. (Cl. 73—189)

This invention relates to a fluid velocity and direction of flow indicator, and more particularly to an indicator of that character for a mobile craft.

An object of my present invention is to provide a streamlined body mounted to and rotatable with respect to a mobile craft, the streamlined body incorporating pressure means responsive to the impact and static pressures of the fluid through which said body is moved, or around which said fluid moves; said pressure responsive means operating an electrical transmitter for indicating at a remote point the velocity of the mobile craft, or the velocity of the fluid medium.

A further object of my invention is to provide a transmitter for the mounting of the streamlined body described for transmitting to a remote point the position the streamlined body assumes with respect to a reference axis of the mobile craft due to the flow of the fluid medium about said body.

Another object of this invention is to provide an instrument at a point remote from the mounting of the streamlined body to show the velocity of the fluid medium flowing around said body and the position assumed by said body in the fluid medium with respect to a reference axis.

Still another object of the present invention is to provide a compact and rugged device of the character described which shall be automatic and positive in its operation, inexpensive to manufacture, which shall have a large variety of applications, and yet be practical and efficient to a high degree in use.

Other objects of the invention will in part be obvious and in part hereinafter pointed out.

The invention accordingly consists in the features of construction, the combinations of elements, and the arrangement of parts which will be exemplified in the construction hereinafter described; and of which the scope of application will be indicated in the appended claims.

In the accompanying drawings forming a part of this specification in which one of the various illustrative embodiments of my invention is shown, and wherein similar reference characters designate corresponding parts throughout the several views.

Fig. 1 is a diagrammatic view of a device embodying the invention in which portions thereof are illustrated in side elevational cross section and other portions in front elevation.

Fig. 2 is a side elevational view of an indicating instrument, portions of which are shown in cross section, while Fig. 3 is a wiring diagram showing the circuit connections of the indicator.

Referring now in detail to Fig. 1 of the drawings, 10 designates an indicator embodying the invention, and comprises a transmitter member 11 and an instrument 12 located at a remote point and interconnected by cables 13 and 14 to an amplifier 15 and to said transmitter member. Power is supplied to the various units from an A. C. source designated by the numeral 16.

The transmitter member 11 comprises a streamlined hollow member 17 and a streamlined hollow body 18 rotatably mounted to and beneath the member 17. Member 17 is adapted to be fixed to a mobile craft (not shown) and in the fluid medium through which said craft moves, as for example, to the underside of an aircraft, or to the hull of a ship or other floating member. The streamlined body 18 is provided with suitable vanes 19 whereby the flow of the fluid medium around said body will cause said body to assume an upstream direction.

Rotatably mounted within the hollow member 17 is a vertical hollow shaft 20 supported at either end by a suitable bearing 21. The lower end of shaft 20 extends slightly below the exterior lower face of the member 17. Fixed to said shaft in a suitable manner is an armature or rotor coil 22. Below the coil 22 are fixed six slip rings 23 through 28, and associated brushes (not shown). The ends of the coil 22 are connected through the hollow shaft 20 to slip rings 23 and 24. The slip rings are connected through their respective brushes to leads 29 and 30 of cable 13. Fixed within an annular flange 31 provided within body 17 is a three phase stator winding 32, the ends of the windings being connected to leads 33, 34 and 35 of cable 13.

The streamlined body 18 is suitably fixed to and made integral with the lower end of the shaft 20. The rounded nose portion 36 of body 18 is provided with an internal boss 37 having a bore or opening 38 forming the impact pressure opening for the unit. Fixed to said boss in a suitable manner is a pressure responsive diaphragm 39, the interior of the diaphragm being in communication with the bore 38. The exterior of the diaphragm is subjected to the pressure within the body 18, an opening 40 in the body 18 providing communication between the interior of said body and the exterior to form the static pressure opening for said unit.

Fixed to the rear wall of diaphragm 39 is a rod 41. Fixed about said rod is a coil 42, the ends of which are connected to leads 43 and 44 through the hollow shaft 20 to the slip rings 25 and 26, respectively. The slip rings 25 and 26 are connected through their respective brushes to the leads 45 and 46 of the cable 13. Mounted within body 18 is a coil frame 47 slidably mounting the rod 41. Wound on said frame are two series connected oppositely wound coils 48 and 49 (Fig. 3), the ends of said coils being connected by leads 50 and 51 through the hollow shaft 20 to the slip rings 27 and 28. The slip rings are connected in turn to the leads 52 and 53, respectively, of the cable 13.

Referring now to Figs. 1 and 2 of the drawings, the indicating instrument 12 is provided with a casing 55 supported on a bracket 56 in the fore part thereof. Fixed to said bracket is a dial 57 provided with a cover glass 58. Fastened at the rear of the bracket is a self-synchronous receiver 59 of the inductive type, having a rotor winding 60 and a stator winding 61. The rotor winding 60 is mounted on a hollow shaft 62 suitably supported in the bearings 63, the fore part of said shaft passing through the bracket 56 and dial 57. Fixed to the end of the shaft 62 is an indicating hand 64 having the shape of a plane silhouette. Receiver 59 will hereinafter be referred to as the direction receiver.

Fixed to the rear of casing 55, as by bolts 65 and spacers 66, is a velocity receiving unit 67 comprising a self-synchronous receiver 68 and a two phase induction motor 69. (Fig. 3.) The receiver 68 comprises a rotor 70 and a stator 71, while the motor 69 comprises a rotor 72, a fixed phase 73 and a variable phase 74. The rotor of said receiver is mounted on a shaft 75 adapted to be driven through suitable gearing (indicated by the dashed line 76 in Fig. 3) by the induction motor. The rotor shaft 75 extends into the fore part of casing 55 through the hollow shaft 62 of the direction receiver. The forward end of shaft 75 is provided with a pointer 77 which is read with respect to the dial 57.

Referring now to Fig. 3, the stator windings 32 of the direction transmitter are connected by leads 33, 34 and 35 to the stator windings 61 of the direction receiver 59. The rotor winding 22 is connected by leads 29 and 30 to the leads 78 and 79 of the power supply 16, the leads 29 and 30 serving to connect the rotor coil 60 of the velocity receiver 59 to the power supply lines. The series connected windings 48 and 49 of the velocity transmitter are connected by the leads 50 and 51 to the ends of two coils of the stator windings 71 of the direction receiver. The third coil of said stator is not used. The movable coil 42 of the velocity transmitter is connected by the leads 43 and 44 to the power supply leads 78, 79.

The rotor coil 70 of receiver 68 is connected by leads 82 and 83 to the amplifier 15, lead 83 being shown connected to the grid of a triode stage 84. The variable phase 74 of induction motor 69 is connected by leads 85 and 86 to the output of the amplifier, lead 86 being shown connected to the plate of tube 84. The fixed phase 73 of said motor is connected by leads 87 and 88 to the power supply leads 78, 79.

*Operation*

The transmitter member 11 may be fixed to the underside of an aircraft, such as a helicopter for example. When the helicopter hovers over a landmark or reference point, the prevailing wind will act upon the streamlined body 18 to turn the nose 36 thereof in an upwind direction. The rotation of the body 18 will rotate the shaft 20 causing an angular displacement of the rotor coil 22 with respect to the stator coils 32. Due to the current in coil 22, an E. M. F. will be induced in the stator windings 32. The resultant current in windings 32 will flow through the stator windings 61 of the receiver 59. The magnetic reaction of the current in windings 61 and in the rotor 60 will cause the rotor to assume a position corresponding to that of the transmitter rotor 22.

Rotation of the rotor 60 will position the indicating hand 64 with respect to the dial 57. The hand 64 when read on said dial, will give the wind direction with respect to a predetermined axis of the aircraft, preferably the fore and aft axis.

The wind velocity is similarly determined. The expansion and contraction of the diaphragm 39 due to the differential in static and impact pressures acting on the Pitot tube assembly will move coil 42 with respect to the windings 48, 49. Coil 42 acts as the primary of a transformer, while coils 48, 49 act as a secondary. Since the coils are oppositely wound, the current induced therein by coil 42 will be 180° out of phase. When coil 42 is in the central position as shown in Fig. 3, the voltage induced in windings 48, 49 will cancel each other.

Movement of the coil 42 in response to the expansions and contractions of the diaphragm 39 will induce a greater E. M. F. in one coil 48 (or 49) than in the other. The resultant E. M. F., or signal, is impressed upon the two stator windings 71 of receiver 68 by leads 80, 81. The current in windings 71 will induce a voltage in the rotor coil 70 of the receiver 68. The induced voltage in coil 70 is then amplified through amplifier 15 and applied to the variable phase 74 of the induction motor 69.

The motor 69 will then drive the rotor 70 of the receiver 68 to a null position corresponding to the position of coil 42 of the transmitter. Pointer 77 will thus be moved over the dial 57 to indicate the wind velocity.

While the above operation has been described in connection with a hovering helicopter, the use of the indicator of the present invention is not limited thereto. The indicator is useful in determining and indicating at a remote point the slipstream direction and airspeed of an aircraft, the direction and speed of tides and currents, and the wind direction and velocity for weather purposes.

It will thus be seen that there is provided a device in which the several objects of this invention are achieved, and which is well adapted to meet the conditions of practical use.

As various possible embodiments may be made of the above invention, and as various changes may be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. An instrument for use with a mobile craft adapted for travel in a moving fluid medium for indicating the velocity of the fluid medium relative to the craft as well as the direction of the flow of the fluid medium relative to the fore and aft axis of the craft, comprising a direction indicator and a velocity indicator located on the craft, a streamlined member supported by the craft at a point remote from said indicators, a displaceable electrical device mounted in said member for developing, when the craft fore and aft axis is in a position other than an up-stream position relative to the fluid medium, a signal representative of the direction of flow of the fluid medium relative to the craft fore and aft axis, a second streamlined member having dynamic and static pressure openings therein rotatably supported by said first member and provided with means thereon for maintaining it in an up-stream position relative to the fluid medium, means interconnecting the electrical device for displacement by the second member, a second electrical device mounted within said second member and developing a signal in accordance with the difference of the dynamic and static pressures communicated to said second member, and means for operating said indicators in accordance with said signals.

2. Means for use with a mobile craft adapted for travel in a moving fluid medium for indicating the velocity of the fluid medium relative to the craft as well as the direction of the flow of the fluid medium relative to the fore and aft axis of the craft, comprising a combined indicating instrument mounted on the craft having a pair of coaxially mounted pointers and an electrical receiver for displacing each of the pointers, a hollow streamlined member supported by the craft at a point remote from said instrument, a displaceable electrical transmitter device mounted within said member for developing, when the craft fore and aft axis is in a position other than an up-stream position relative to the fluid medium, a signal representative of the direction of flow of the fluid medium relative to the craft fore and aft axis, a second hollow streamlined member having dynamic and static pressure openings therein rotatably supported by said first member and provided with means thereon for maintaining it in an up-stream position relative to the fluid medium, means interconnecting the electrical transmitter for displacement by the second member, a second electrical transmitter device mounted within said second member and developing a signal in accordance with the difference of the dynamic and static pressures communicated to said second member, and means electrically interconnecting the transmitters with the direction and velocity receivers.

3. An instrument for use with a mobile craft adapted for travel in a moving fluid medium for indicating the velocity of the fluid medium relative to the craft as well as the direction of the flow of the fluid medium relative to the fore and aft axis of the craft, comprising a direction indicator and a velocity indicator located on the craft, a streamlined member supported by the craft at a point remote from said indicators, a shaft journalled in said member for angular displacement about an axis normal to the craft fore and aft axis, a two-part electrical device within said member having one part thereof fixed to said member and the other part thereof supported by said shaft for angular displacement relative to the fixed part for developing a signal when the craft fore and aft axis is in a position other than an up-stream position relative to the fluid medium, a second streamlined member having dynamic and static pressure openings therein rotatably supported on said first member by said shaft and provided with means thereon for maintaining it in an up-stream position relative to the fluid medium whereby said shaft is displaced by said second member when the craft fore and aft axis is in a position other than an up-stream position relative to the fluid medium, a second electrical device mounted within said second member and developing a signal in accordance with the difference of the dynamic and static pressures communicated to said second member, and means for operating said indicators in accordance with said signals.

4. Means for use with a mobile craft adapted for travel in a moving fluid medium for indicating the velocity of the fluid medium relative to the craft as well as the direction of the flow of the fluid medium relative to the fore and aft axis of the craft, comprising a combined indicating instrument mounted on the craft having a pair of pointers and an electrical receiver device for displacing each of the pointers, a streamlined member supported by the craft at a point remote from said indicators, a two-part electrical signal developing device within said member having one part thereof fixed to said member, the other part of the electrical device being displaceable, a second streamlined member having dynamic and static pressure openings therein rotatably supported on said first member and provided with means thereon for maintaining it in an upstream position relative to the fluid medium, means interconnecting the movable part of the electrical device with said second member whereby a signal is developed by said electrical device representative of the amount of displacement of the craft fore and aft axis relative to said second member, a second two-part electrical signal device mounted within said second member and developing a signal in accordance with the difference of the dynamic and static pressures communicated to said second member, and means operatively interconnecting said signal devices with said receiver devices.

RICHARD L. DIVOLL.

REFERENCES CITED

The following references are of record in the file of this patent:

UNITED STATES PATENTS

| Number | Name | Date |
|---|---|---|
| 1,708,333 | Smith | Apr. 9, 1929 |
| 1,850,640 | Sperry et al. | Mar. 22, 1932 |
| 2,175,039 | Soulary | Oct. 3, 1939 |
| 2,178,422 | Heagney | Oct. 31, 1939 |
| 2,191,955 | Chappell et al. | Feb. 27, 1940 |
| 2,260,837 | Kuehni | Oct. 28, 1941 |
| 2,283,712 | Welch | May 19, 1942 |
| 2,305,626 | Lee | Dec. 22, 1942 |
| 2,361,738 | Bird | Oct. 31, 1944 |
| 2,375,227 | Hillman | May 8, 1945 |
| 2,390,384 | Poole | Dec. 4, 1945 |
| 2,438,406 | Konet | Mar. 23, 1948 |
| 2,462,577 | Warren | Feb. 22, 1949 |